United States Patent [19]

Kato et al.

[11] Patent Number: 5,442,000
[45] Date of Patent: Aug. 15, 1995

[54] CONNECTOR MOLDING COMPOSITION COMPRISING AN IMPACT MODIFIED AND STABILIZED POLYESTER

[75] Inventors: Tetsuo Kato; Masahiro Kanda, both of Shizuoka, Japan

[73] Assignee: Yazaki Corporation, Tokyo, Japan

[21] Appl. No.: 155,695

[22] Filed: Nov. 23, 1993

[30] Foreign Application Priority Data

Nov. 24, 1992 [JP] Japan .................. 4-313447

[51] Int. Cl.$^6$ .................. C08L 67/02; C08L 55/00; C08L 51/06; C08K 5/13
[52] U.S. Cl. .................. 524/291; 524/302; 524/304; 524/504; 524/513; 524/303; 524/307
[58] Field of Search ............ 524/291, 302, 304, 504, 524/513

[56] References Cited

U.S. PATENT DOCUMENTS 4,327,012 4/1982 Salee .................. 524/513
5,162,412 11/1992 Liu .................. 524/291

FOREIGN PATENT DOCUMENTS 0292251 11/1988 European Pat. Off.
0388231 9/1990 European Pat. Off.
0397456 11/1990 European Pat. Off.

OTHER PUBLICATIONS

CA 112(24):218107t (JP 01,236,266, Mochizuki et al., Sep. 21, 1989.
CA 111 (20):175439n (EP 314,188 A2), Orikasa et al., May 3, 1989.
Derwent Publications Ltd., London, GB; AN 87-141002 (JP-A-62 081 444 (Toyobo KK) Apr. 14, 1987).

*Primary Examiner*—Paul R. Michl
*Assistant Examiner*—Andrew E. C. Merriam
*Attorney, Agent, or Firm*—Sughrue, Mion, Zinn, Macpeak & Seas

[57] ABSTRACT

A connector comprising a housing comprising a polybutylene terephthalate resin composition comprising:

(A) 100 parts by weight of a polybutylene terephthalate resin having an intrinsic viscosity of from 1.10 to 1.30 dl/g as measured in o-chlorophenol at 25° C.;

(B) from 40 to 60 parts by weight of a copolymer of acrylonitrile and styrene;

(C) from 10 to 20 parts by weight of a graft copolymer comprising:
 (C1) from 65 to 75% by weight of copolymer comprising from 75 to 85% by weight of ethylene and from 25 to 15% by weight of glycidyl methacrylate, and
 (C2) from 25 to 35% by weight of a copolymer of acrylonitrile and styrene;

(D) from 0.05 to 0.5 part by weight of a hindered phenol compound represented by formula (I):

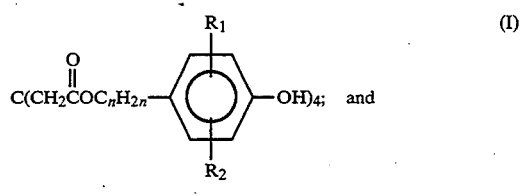

(E) from 0.05 to 0.5 part by weight of a thioether compound represented by the following formula (II):

$$(R_3SR_4COOCH_2)_mC(CH_2OH)_{4-m} \qquad (II)$$

wherein the variables are defined in the specification.

2 Claims, 2 Drawing Sheets

CONNECTOR MOLDING COMPOSITION COMPRISING AN IMPACT MODIFIED AND STABILIZED POLYESTER

FIELD OF THE INVENTION

The present invention relates to a connector which is lightweight and excellent in dimensional stability, heat resistance, mechanical property, and productivity and also in fitting feeling.

BACKGROUND OF THE INVENTION

Connectors having various kinds of plastic housings (hereinafter, referred to simply as "connectors") have conventionally been used for connecting circuits of electric and electronic instruments or devices for use in motor vehicles. With the recent progress in the production of lower-pollution motor vehicles, there is a growing demand for more lightweight connectors. Further, with the trend toward performance and function increase in motor vehicles, the connectors have come to be required to, have a smaller size, more complicated form, improved heat resistance, improved fitting feeling, etc. The connectors are also required to have improved productivity.

Connectors made of a polybutylene terephthalate resin (hereinafter, sometimes referred to as "PBT resin") which have been used in motor vehicles in a large number are excellent in heat resistance, dimensional stability, moldability, and other properties. However, these connectors have had a problem of large weight due to the high specific gravity of the PBT resin.

Although 6-nylon resins and 6,6-nylon resins may be advantageously used for the weight reduction of connectors since these resins have lower specific gravities than PBT resins, the nylon resins have had a problem that they exhibit high moisture absorption, and therefore the connectors suffer a dimensional change and deterioration in mechanical property upon moisture absorption. Thus, 6-nylon and 6,6-nylon resins fail to satisfy the demand for size reduction, moldability to the complicated shape, and improvement in fitting feeling of connectors.

Other attempts have been made to reduce the weight of connectors by foaming or by incorporating a hollow filler, but such techniques have been defective in, for example, that accurate molding is difficult and the deterioration of mechanical properties is severe.

There has not been a connector which satisfies all the performance requirements.

SUMMARY OF THE INVENTION

An object of the present invention is to eliminate the above-described problems of the conventional techniques and to provide a connector which is lightweight and excellent in dimensional stability, heat resistance, mechanical property, productivity, and fitting feeling.

Other objects and effects of the present invention will be apparent from the following description.

As a result of intensive investigations made by the present inventors in order to attain the above objects, it has been found that the objects can be attained by forming a connector using a polybutylene terephthalate (TBP) resin composition comprising specific components in a specific proportion. The present invention has thus been accomplished.

The present invention relates to a connector comprising a housing comprising a polybutylene terephthalate resin composition comprising:

(A) 100 parts by weight of a polybutylene terephthalate resin having an intrinsic viscosity of from 1.10 to 1.30 dl/g as measured in o-chlorophenol at 25° C.;

(B) from 40 to 60 parts by weight of a copolymer of acrylonitrile and styrene;

(C) from 10 to 20 parts by weight of a graft copolymer comprising:

(C1) from 65 to 75% by weight of a copolymer comprising from 75 to 85% by weight of ethylene and from 25 to 15% by weight of glycidyl methacrylate, and (C2) from 25 to 35% by weight of a copolymer of acrylonitrile and styrene;

(D) from 0.05 to 0.5 part by weight of a hindered phenol compound represented by formula (I):

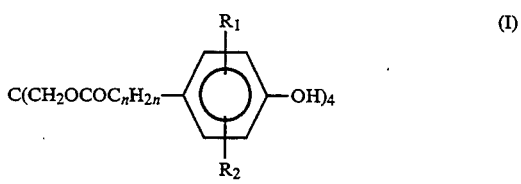

wherein n represents an integer of from 0 to 6, and $R_1$ and $R_2$ each represents an alkyl group having from 1 to 6 carbon atoms, a substituted alkyl group having from 1 to 6 carbon atoms, or a cycloalkyl group having from 3 to 6 carbon atoms; and (E) from 0.05 to 0.5 part by weight of a thioether compound represented by the following formula (II):

wherein m represents an integer of from 1 to 4, $R_3$ represents an alkyl group, and $R_4$ represents an alkylene group.

DETAILED DESCRIPTION OF THE INVENTION

Figure 1:
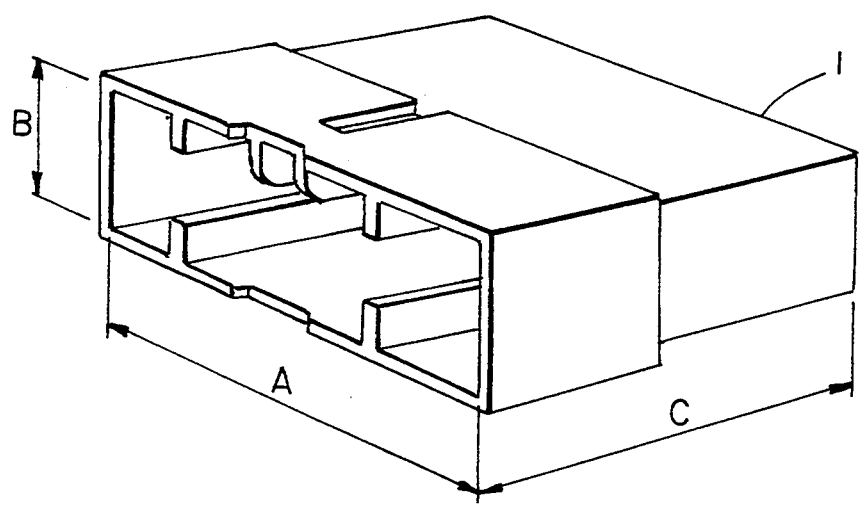
FIG. 1 is a perspective view illustrating an external connector housing of a motor vehicle connector according to the present invention.

The PBT resin (A) as a component of the PBT resin composition used in the present invention can be produced from terephthalic acid or an ester-forming derivative thereof, e.g., a lower alcohol ester such as the dimethyl ester, and 1,4-butanediol. The PBT resin (A) has an intrinsic viscosity of from 1.10 to 1.30 dl/g, preferably from 1.15 to 1.25 dl/g, as measured in o-chlorophenol at 25° C. If the intrinsic viscosity thereof is less than 1.10 dl/g, the PBT resin composition has impaired toughness and impact strength and is not suitable as a connector material. If the intrinsic viscosity thereof is more than 1.30 dl/g, the PBT resin composition shows impaired flowability during injection molding, so that it is difficult to obtain satisfactory moldings in the case of producing complicated moldings such as connector housings.

The acrylonitrile-styrene copolymer (hereinafter, sometimes referred to simply as "AS copolymer") (B) is incorporated in the PBT resin composition used in the present invention in an amount of from 40 to 60 parts by weight, preferably from 45 to 55 parts by weight, per 100 parts by weight of the PBT resin (A) described above. If the amount of the AS copolymer (B) is less than 40 parts by weight, it is undesirable in that the effect of weight reduction, which is an object of the present invention, is deteriorated. If the amount thereof is more than 60 parts by weight, the excellent heat resistance and toughness inherent in the PBT resin cannot be exhibited, resulting in a resin composition unsuited as a connector material. The weight ratio of acrylonitrile to styren in the AS copolymer (B) is preferably from 5/95 to 50/50. The AS copolymer (B) preferably has a melt flow rate (at 230° C. and a load of 3.8 kg) of from 5 to 30 g/10 min, more preferably from 10 to 25 g/10 min, and particularly preferably from 12 to 18 g/10min.

The graft copolymer (C) in the resin composition used in the present invention comprises (C1) 65 to 75% by weight of an ethylene-glycidyl methacrylate copolymer and (C2) from 25 to 35% by weight an acrylonitrile-styrene copolymer.

The ethylene-glycidyl methacrylate copolymer (C1) comprises from 75 to 85% by weight of ethylene and from 25 to 15% by weight of glycidyl methacrylate. If the glycidyl methacrylate unit content in the ethylene-glycidyl methacrylate copolymer (C1) is more than 25% by weight, the flowability of the PBT resin composition is impaired, resulting in difficulties in connector molding. If the glycidyl methacrylate unit content is less than 15% by weight, the mechanical properties of the PBT resin composition are impaired, resulting in a resin composition unsuited for use as a connector.

The content of the ethylene-glycidyl methacrylate copolymer (C1) in the graft copolymer (C) is from 65 to 75% by weight. If the content of the ethylene-glycidyl methacrylate copolymer (C1) is less than 65% by weight, low-temperature toughness of the PBT resin composition is impaired, resulting in a resin composition unsuited as a connector material. If the content thereof is more than 75% by weight, mechanical properties of the PBT resin composition are impaired.

In the acrylonitrile-styrene copolymer (C2), the weight ratio of acrylonitrile to styrene is generally from 5/95 to 50/50, and preferably from 10/90 to 40/60.

The graft copolymer (C) preferably has a melt flow rate (at 190° C. and a load of 2.16 kg) of from 0.1 to 1.5 g/min, and more preferably from 0.2 to 1.0 g/min.

The amount of the graft copolymer (C) incorporated in the PBT resin composition used in the present invention is from 10 to 20 parts by weight, preferably from 14 to 20 parts by weight, more preferably from 16 to 18 parts by weight, per 100 parts by weight of the PBT resin (A). If the amount of the graft copolymer (C) is less than 10 parts by weight, toughness of the PBT resin composition is impaired, resulting in a resin composition insufficient in performance as a connector material. If the amount thereof is more than 20 parts by weight, it is difficult to apply the PBT resin composition to a connector because a connector housing insufficient in rigidity and terminal-holding strength.

The PBT resin composition used in the present invention further comprises the hindered phenol compound (D) and the thioether compound (E) as antioxidants. By using these compounds, the long-term durability of connectors has significantly improved.

The hindered phenol compound (D) is represented by formula (I):

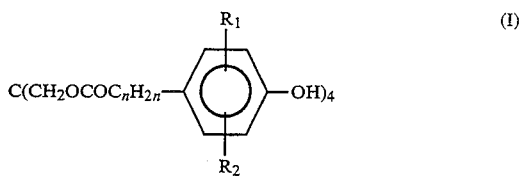

wherein n represents an integer of from 0 to 6, and $R_1$ and $R_2$ may be the same or different and each represents an alkyl group having from 1 to 6 carbon atoms, a substituted alkyl group having from 1 to 6 carbon atoms, and a cycloalkyl group having 1 to 6 carbon atoms, with a t-butyl group being preferred. Examples of the hindered phenol compound represented by formula (I) include pentaerythrityl tetrakis(3-(3,5-di-t-butyl-4-hydroxyphenyl)propionate).

The hindered phenol compound (D) is incorporated in the PBT resin composition used in the present invention in an amount of from 0.05 to 0.5 part by weight, preferably from 0.2 to 0.5 part by weight, per 100 parts by weight of the PBT resin (A). If the amount of the hindered phenol compound (D) is less than 0.05 part by weight, it is impossible to attain long-term heat resistance of such a level that the resin composition withstands use as a connector material, even if the hindered phenol compound (D) is used in combination with the thioether compound (E) described below. If the amount of the hindered phenol compound (D) is more than 0.5 part by weight, it is undesirable in that not only such amounts are uneconomical, but also the effect of improving long-term heat resistance cannot be enhanced any more and moldability and mechanical properties are reduced considerably, far from being improved.

If the hindered phenol compound (D) is incorporated in the PBT resin composition used in the present invention but the thioether compound (E) described below is not used, the resin composition is insufficient in the heat resistance required as a connector material. By incorporating the hindered phenol compound (D) in combination with the thioether compound (E), a synergistic effect is produced.

The thioether compound (E) is represented by formula (II):

$$(R_3SR_4COOCH_2)_mC(CH_2OH)_{4-m} \qquad (II)$$

wherein m represents an integer of from 1 to 4, $R_3$ represents an alkyl group, and $R_4$ represents an alkylene group.

Examples of thioether compound (E) include tetrakis(methylene-3-(laurylthio)propionato)methane.

The thioether compound (E) is incorporated in an amount of from 0.05 to 0.5 part by weight, preferably from 0.2 to 0.5 part by weight, per 100 parts by weight of the PBT resin (A). If the amount of the thioether compound (E) is less than 0.05 part by weight, sufficient long-term heat resistance cannot be obtained, even if the thioether compound (E) is used in combination with the hindered phenol compound (D) described above. Even if the amount of the thioether compound (E) exceeds 0.5 part by weight, the effect of improving heat resistance cannot be enhanced any more and the resin composition becomes disadvantageous in moldability, mechanical property, and cost, far from being improved.

Various other additives can be further incorporated into the PBT resin composition used in forming the connector of the present invention, as far as the effects of the present invention are not impaired, in order to improve properties of the resin composition according to purposes. Examples of such additives include a stabilizer against weathering and light, a lubricant, a release agent, a nucleating agent, an antistatic agent, a flame retardant, a surfactant, and a colorant.

The PBT resin composition used in the present invention can be obtained by mixing the above-described ingredients (A) through (E), as well as other additives if used, and melt-kneading the mixture with heating. For the kneading, a conventionally known kneading device for compounds can be used, such as a single-screw or twin-screw extruder or a kneader.

The connector housing used in the connector according to the present invention can be molded from the thus-produced PBT resin composition using a known injection molding machine or other known device.

The connector housing of the connector according to the present invention can be appropriately designed depending on the end use, such as the number or the shape of holes into which terminals of a connector are to be inserted, the shape of the locking part, and the shape of the housing. Accordingly, the connector according to the present invention is not limited by any means by the end use, the kind or the shape.

The present invention will be described in more detail by reference to the following examples, but the invention is not construed as being limited thereto.

The following ingredients were used in the Examples and Comparative Examples:
(A): PBT resin (intrinsic viscosity, IV, in o-chlorophenol at 25° C.: 1.20 dl/g)
(B): AS copolymer (weight ratio of acrylonitrile/styrene: 40/60)
(C): Graft copolymer of ethylene-glycidyl methacrylate copolymer and acrylonitrile-styrene copolymer (weight ratio of ethylene/glycidyl methacrylate: 83/17; weight ratio of ethylene-glycidyl methacrylate copolymer/acrylonitrile-styrene copolymer: 70/30)
(D): Hindered phenol compound (antioxidant) (pentaerythrityl tetrakis(3-(3,5-di-t-butyl-4-hydroxyphenyl)-propionate))
(E): Thioether compound (antioxidant) (tetrakis(methylene-3-(laurylthio)propionato)methane)

EXAMPLE 1

The PBT resin (A) was mixed with the AS copolymer (B), the graft copolymer of ethylene-glycidyl methacrylate copolymer and acrylonitrile-styrene copolymer (C), the hindered phenol compound (D), and the thioether compound (E) according to the formulation shown in Table 1. The mixture was melt-kneaded by means of a twin-screw extruder and the strands thus-extruded were cut with a pelletizer to obtain a resin composition in a pellet form.

Figure 2:
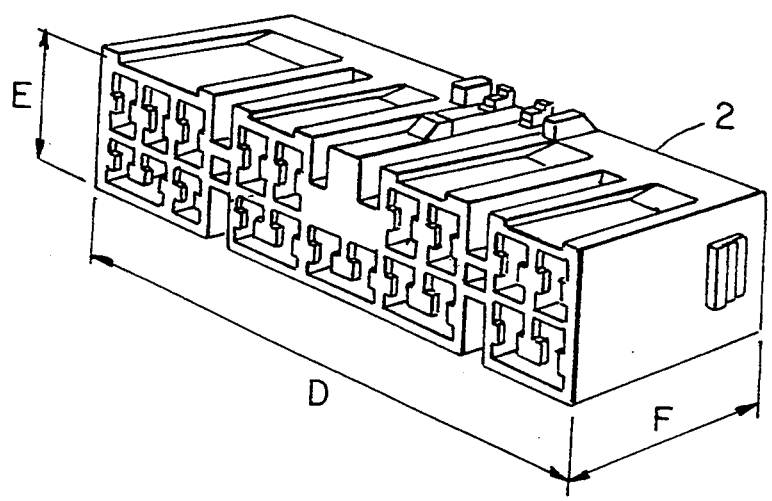
FIG. 2 is a perspective view illustrating an internal connector housing of a motor vehicle according to the present invention.

The resin composition was used to mold external and internal connector housings having the shapes shown in FIGS. 1 and 2, respectively, using an injection molding machine ("IS55EN", manufactured by Toshiba Corp., Japan) under the following molding conditions, thereby to obtain a connector according to the present invention.

Injection Molding Conditions:
Cylinder temperature: 260° C.
Mold temperature: 25° C.
Injection pressure: 900 kgf/cm$^2$
Injection speed: intermediate The height, width, and depth (corresponding to B, A, and C, respectively, in FIG. 1) of the external connector housings were 16.4 mm, 58.7 mm, and 38.0 mm, respectively, and the volume thereof was 11.85 cm$^3$. The height, width, and depth (corresponding to E, D, and F, respectively, in FIG. 2) of the internal connector housings were 12.0 mm, 54.7 mm, and 22.0 mm, respectively, and the volume thereof was 5.45 cm$^B$. In FIGS. 1 and 2, numeral 1 denotes an external housing and 2 denotes an internal housing.

EXAMPLE 2

The PBT resin (A) was mixed with the AS copolymer (B), the graft copolymer of ethylene-glycidyl methacrylate copolymer and acrylonitrile-styrene copolymer (C), the hindered phenol compound (D), and the thioether compound (E) according to the formulation shown in Table 1. The mixture was kneaded and extruded in the same manner as in Example 1 to obtain a resin composition.

The resin composition was used to mold connector housings having the same shapes as those in Example 1 under the same molding conditions as in Example 1, thereby to obtain a connector according to the present invention.

COMPARATIVE EXAMPLE 1

The PBT resin (A) alone was used in place of the resin composition used in Example 1, as shown in Table 1, to mold connector housings having the same shapes as those in Example 1 under the same molding conditions as in Example 1, thereby to obtain a comparative connector.

COMPARATIVE EXAMPLE 2

Connector housings having the same shapes as those in Example 1 were molded under the same molding conditions as in Example 1 except that a 6,6-nylon resin ("2020 UW1", manufactured by Ube Industries, Ltd., Japan) was used in place of the resin composition used in Example 1 and that the cylinder temperature was changed to 280° C. Thus, a comparative connector was obtained.

TABLE 1

| Formulation of Resin Composition | | | | |
|---|---|---|---|---|
| Ingredient | Example | | Comparative Example | |
| (part by weight) | 1 | 2 | 1 | 2 |
| (A) PBT resin | 100 | 100 | 100 | — |
| (B) AS copolymer | 50 | 55 | — | — |
| (C) Graft copolymer | 17 | 20 | — | — |
| 6,6-Nylon | — | — | — | 100 |
| (D) Hindered phenol antioxidant | 0.1 | 0.1 | — | — |
| (E) Thioether antioxidant | 0.3 | 0.3 | — | — |

Each of the connector housings thus obtained was evaluated for the following properties and compared.

(1) Lightweight Property:

The specific gravity of the connector housing was measured by a water substitution method.

(2) Dimensional Stability against Moisture Absorption:

The connector housing was conditioned at 35° C. and 95% RH for 110 hours, and the dimensions of A, B, C, D, E, and F were measured to obtain a rate of dimensional change (%) due to moisture absorption at each site according to the following equation:

Rate of Dimensional Change (%) = $(A-B)/B \times 100$

A: Each dimension at saturation of water absorption

Figure 3:
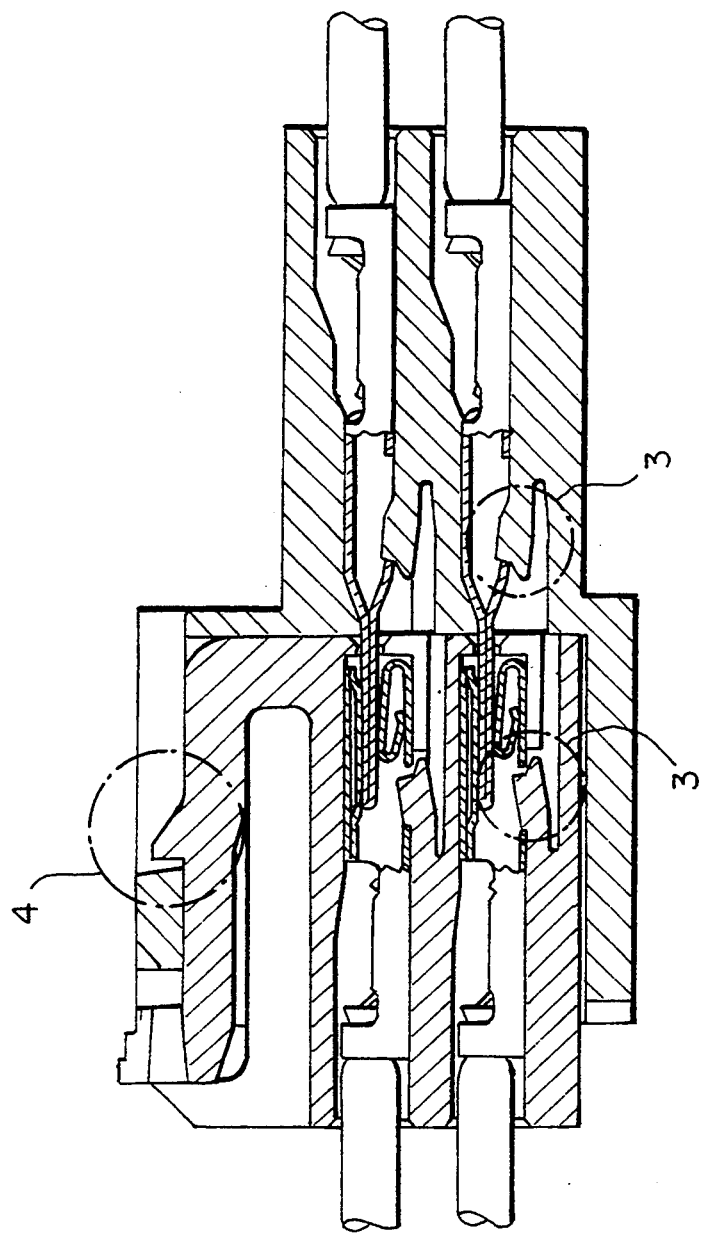
FIG. 3 is a cross-sectional view illustrating a connector of a motor vehicle according to the present invention, in which external and internal housings are fitted to each other.

B: Each dimension immediately after molding (3) Heat Resistance:

The connector housing was heat treated at 120° C. for 1,000 hours. A terminal having contact-bonded thereto a wire of about 100 mm in length was fixed to each of the thus heat-treated housing and the housing immediately after molding as shown in FIG. 3. The wire was pulled at a constant speed of about 100 mm/min, and the load (kgf) required for the terminal to be drawn from connecting part 3 in FIG. 3 (i.e., terminal retaining force) was measured. Any change of the appearance of the housing due to the heat treatment was also observed.

(4) Fitting Property:

After conditioning at 35° C. and 95% RH for 110 hours, the external housing was fitted into the internal housing at a speed of 250 mm/min in a non-resonant box. The sound pressure of the sound generated from fitting part 4 in FIG. 3 at the time of fitting was measured with a noise meter, and the sound pressure was analyzed by an analyzing recorder manufactured by Yokogawa Hokushin Denki Co., Ltd. to evaluate fit of the two housings. The higher the sound pressure, the better the fit in connecting. The results of the above evaluations are shown in Tables 2, 3, and 4.

TABLE 2

Light Weight Property and Dimensional Stability against Moisture

| Example No. | Specific Gravity | Dimensional Change by Moisture Absorption | | | | | |
|---|---|---|---|---|---|---|---|
| | | A (%) | B (%) | C (%) | D (%) | E (%) | F (%) |
| Example 1 | 1.18 | 0.02 | 0.04 | 0.11 | 0.12 | 0.04 | 0.14 |
| Example 2 | 1.17 | 0.01 | 0.02 | 0.08 | 0.10 | 0.03 | 0.11 |
| Comparative Example 1 | 1.31 | 0.01 | 0.08 | 0.11 | 0.16 | 0.04 | 0.21 |
| Comparative Example 2 | 1.14 | 1.10 | 1.67 | 1.49 | 1.87 | 2.11 | 2.04 |

TABLE 3

| | Heat Resistance | | | | |
|---|---|---|---|---|---|
| | Terminal Retaining Force (kgf) | | | | |
| | Before Heat Treatment | | After Heat Treatment | | Change of Appearance |
| Example No. | External | Internal | External | Internal | |
| Example 1 | 8.2 | 7.8 | 8.6 | 8.4 | no change |
| Example 2 | 7.8 | 7.6 | 8.1 | 8.5 | no change |
| Comparative Example 1 | 8.0 | 7.6 | 6.8 | 6.2 | no change |
| Comparative Example 2 | 11.7 | 10.0 | 12.6 | 11.1 | browned |

TABLE 4

| | Fitting Property | | | |
|---|---|---|---|---|
| | Before Moistening | | After Moistening | |
| Example No. | Maximum Frequency (kHz) | Maximum Sound Pressure (dB) | Maximum Frequency (kHz) | Maximum Sound Pressure (dB) |
| Example 1 | 3.8 | 91 | 3.9 | 87 |
| Example 2 | 3.8 | 90 | 3.9 | 87 |
| Comparative Example 1 | 3.7 | 90 | 3.8 | 87 |
| Comparative Example 2 | 4.7 | 81 | 4.2 | 68 |

As Tables 2, 3, and 4 show, the connectors of Examples 1 and 2, which satisfy the constitution of the present invention, are low in specific gravity and excellent in lightweight property, have excellent dimensional stability with completely no problem concerning dimensional change by moisture absorption, are excellent in mechanical property and heat resistance, and give a sufficient fitting feeling with substantially no decrease in fitting property by moisture absorption.

The connector of Comparative Example 1 is inferior in lightweight property due to its high specific gravity and also has poor heat resistance, although it is excellent in dimensional stability, mechanical property, and fitting property. The connector of Comparative Example 2 is inferior in stability to dimensional change by water absorption and in fitting property, although it is relatively good in lightweight property.

As described and demonstrated above, the connector of the present invention is lightweight, suffers substantially no dimensional change by moisture absorption, has high heat resistance and good mechanical properties (e.g., terminal-holding strength), gives extremely good fitting feeling, and has excellent productivity.

While the invention has been described in detail and with reference to specific embodiments thereof, it will be apparent to one skilled in the art that various changes and modifications can be made therein without departing from the spirit and scope thereof.

What is claimed is:

1. A connector comprising a housing comprising a polybutylene terephthalate resin composition comprising:
   (A) 100 parts by weight of a polybutylene terephthalate resin having an intrinsic viscosity of from 1.10 to 1.30 dl/g as measured in o-chlorophenol at 25° C.;
   (B) from 40 to 60 parts by weight of a copolymer of acrylonitrile and styrene;
   (C) from 10 to 20 parts by weight of a graft copolymer comprising:
      (C1) from 65 to 75% by weight of copolymer comprising from 75 to 85% by weight of ethylene and from 25 to 15% by weight of glycidyl methacrylate, and (C2) from 25 to 35% by weight of a copolymer of acrylonitrile and styrene;

(D) from 0.05 to 0.5 part by weight of a hindered phenol compound represented by formula (I):

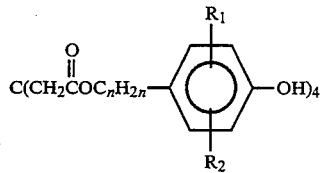

wherein n represents an integer of from 0 to 6, and $R_1$ and $R_2$ each represents an alkyl group having from 1 to 6 carbon atoms, a substituted alkyl group having from 1 to 6 carbon atoms, or a cycloalkyl group having from 3 to 6 carbon atoms; and (E) from 0.05 to 0.5 part by weight of a thioether compound represented by the following formula (II):

$$(R_3SR_4COOCH_2)_mC(CH_2OH)_{4-m} \quad (II)$$

wherein m represents an integer of from 1 to 4, $R_3$ represents an alkyl group, and $R_4$ represents an alkylene group.

2. A connector as claimed in claim 1, wherein said hindered phenol compound (D) is pentaerythrityl tetrakis(3-(3,5-di-t-butyl-4-hydroxyphenyl)propionate), and said thioether compound (E) is tetrakis(methylene-3-(laurylthio)propionato)methane.

* * * * *